(12) United States Patent
Goel et al.

(10) Patent No.: US 8,675,648 B1
(45) Date of Patent: Mar. 18, 2014

(54) METHODS AND APPARATUS FOR COMPRESSION IN PACKET CLASSIFICATION

(75) Inventors: Deepak Goel, Sunnyvale, CA (US);
Ramesh Panwar, Pleasanton, CA (US);
Srinivasan Jagannadhan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/242,143

(22) Filed: Sep. 30, 2008

(51) Int. Cl.
*H04L 12/28* (2006.01)

(52) U.S. Cl.
USPC ............................................ 370/389; 370/392

(58) Field of Classification Search
USPC ................... 370/230, 230.1, 231, 389, 392; 709/232, 233
See application file for complete search history.

(56) References Cited

U.S. PATENT DOCUMENTS

| | | | |
|---|---|---|---|
| 4,215,402 A | 7/1980 | Mitchell et al. | |
| 5,463,777 A | 10/1995 | Bialkowski et al. | |
| 5,473,607 A * | 12/1995 | Hausman et al. | 370/392 |
| 5,495,476 A | 2/1996 | Kumar | |
| 6,073,160 A | 6/2000 | Grantham et al. | |
| 6,157,955 A | 12/2000 | Narad et al. | |
| 6,212,184 B1 | 4/2001 | Venkatachary et al. | |
| 6,226,629 B1 | 5/2001 | Cossock | |
| 6,266,705 B1 | 7/2001 | Ullum et al. | |
| 6,457,058 B1 | 9/2002 | Ullum et al. | |
| 6,587,466 B1 | 7/2003 | Bhattacharya et al. | |
| 6,600,741 B1 | 7/2003 | Chrin et al. | |
| 6,600,744 B1 | 7/2003 | Carr et al. | |
| 6,614,789 B1 | 9/2003 | Yazdani et al. | |
| 6,618,397 B1 | 9/2003 | Huang | |
| 6,654,373 B1 | 11/2003 | Maher, II et al. | |
| 6,658,482 B1 | 12/2003 | Chen et al. | |
| 6,665,274 B1 | 12/2003 | Yamada | |
| 6,675,163 B1 | 1/2004 | Bass et al. | |
| 6,721,316 B1 | 4/2004 | Epps et al. | |
| 6,731,631 B1 | 5/2004 | Chang et al. | |
| 6,731,644 B1 | 5/2004 | Epps et al. | |
| 6,735,670 B1 | 5/2004 | Bronstein et al. | |
| 6,754,662 B1 | 6/2004 | Li | |
| 6,778,532 B1 | 8/2004 | Akahane et al. | |
| 6,778,546 B1 | 8/2004 | Epps et al. | |
| 6,778,984 B1 | 8/2004 | Lu et al. | |
| 6,789,118 B1 | 9/2004 | Rao | |
| 6,813,243 B1 | 11/2004 | Epps et al. | |
| 6,859,455 B1 | 2/2005 | Yazdani et al. | |

(Continued)

OTHER PUBLICATIONS

H. Jonathan Chao et al. "Matching Algorithms for Three-Stage Bufferless Clos Network Switches" IEEE Communications Magazine, Oct. 2003, pp. 46-54.

(Continued)

*Primary Examiner* — Brandon Renner
(74) *Attorney, Agent, or Firm* — Cooley LLP

(57) ABSTRACT

In one embodiment, a method includes receiving a policy vectors associated with a switch fabric, determining a compression scheme, and producing a compressed vector based on the policy vector and the compression scheme. The policy vector is represented by a bit sequence and has a plurality of policy bit values. A policy bit value from the plurality of policy bit vales is configured to trigger an action associated with a data packet in the switch fabric. The compression scheme is determined based on a portion of the policy vector.

15 Claims, 6 Drawing Sheets

(56) References Cited

U.S. PATENT DOCUMENTS

| | | | |
|---|---|---|---|
| 6,862,278 B1* | 3/2005 | Chang et al. ............... 370/389 |
| 6,889,225 B2 | 5/2005 | Cheng et al. |
| 6,917,946 B2 | 7/2005 | Corl, Jr. et al. |
| 6,925,085 B1 | 8/2005 | Krishna et al. |
| 6,940,862 B2 | 9/2005 | Goudreau |
| 6,947,931 B1 | 9/2005 | Bass et al. |
| 6,977,930 B1 | 12/2005 | Epps et al. |
| 7,042,878 B2 | 5/2006 | Li |
| 7,089,240 B2 | 8/2006 | Basso et al. |
| 7,133,400 B1 | 11/2006 | Henderson et al. |
| 7,136,926 B1 | 11/2006 | Iyer et al. |
| 7,173,931 B2 | 2/2007 | Chao et al. |
| 7,190,696 B1 | 3/2007 | Manur et al. |
| 7,193,997 B2 | 3/2007 | Van Lunteren et al. |
| 7,227,842 B1 | 6/2007 | Ji et al. |
| 7,233,568 B2 | 6/2007 | Goodman et al. |
| 7,233,579 B1 | 6/2007 | Crump et al. |
| 7,277,429 B2 | 10/2007 | Norman et al. |
| 7,304,992 B2 | 12/2007 | Relan |
| 7,317,723 B1 | 1/2008 | Guru |
| 7,325,074 B2 | 1/2008 | McRae |
| 7,349,415 B2 | 3/2008 | Rangarajan et al. |
| 7,356,033 B2 | 4/2008 | Basu et al. |
| 7,369,561 B2 | 5/2008 | Wybenga et al. |
| 7,373,345 B2 | 5/2008 | Carpentier et al. |
| 7,382,637 B1 | 6/2008 | Rathnavelu et al. |
| 7,382,777 B2 | 6/2008 | Irish et al. |
| 7,382,876 B2 | 6/2008 | Lauter et al. |
| 7,383,244 B2 | 6/2008 | Bass et al. |
| 7,394,809 B2 | 7/2008 | Kumar et al. |
| 7,403,524 B2 | 7/2008 | Hill |
| 7,403,526 B1 | 7/2008 | Zou et al. |
| 7,403,999 B2 | 7/2008 | Corl, Jr. et al. |
| 7,418,505 B2 | 8/2008 | Lim et al. |
| 7,424,744 B1 | 9/2008 | Wu et al. |
| 7,441,268 B2 | 10/2008 | Remedios |
| 7,480,302 B2 | 1/2009 | Choi |
| 7,525,958 B2 | 4/2009 | Kumar et al. |
| 7,543,052 B1 | 6/2009 | Cesa Klein |
| 7,602,787 B2 | 10/2009 | Cheriton |
| 7,610,330 B1 | 10/2009 | Quinn et al. |
| 7,646,771 B2 | 1/2010 | Guru et al. |
| 7,668,160 B2 | 2/2010 | Narayan et al. |
| 7,738,454 B1 | 6/2010 | Panwar et al. |
| 7,796,541 B1 | 9/2010 | Goel et al. |
| 7,835,357 B2 | 11/2010 | Panwar et al. |
| 7,889,741 B1 | 2/2011 | Panwar et al. |
| 8,111,697 B1 | 2/2012 | Panwar et al. |
| 8,139,591 B1 | 3/2012 | Goel et al. |
| 2002/0138648 A1 | 9/2002 | Liu |
| 2002/0152209 A1 | 10/2002 | Merugu et al. |
| 2002/0191605 A1 | 12/2002 | Lunteren et al. |
| 2003/0023846 A1 | 1/2003 | Krishna et al. |
| 2003/0030575 A1* | 2/2003 | Frachtenberg et al. ......... 341/51 |
| 2003/0053460 A1 | 3/2003 | Suda et al. |
| 2003/0059045 A1 | 3/2003 | Ruehle |
| 2003/0156586 A1 | 8/2003 | Lee et al. |
| 2003/0219017 A1 | 11/2003 | Davis et al. |
| 2003/0223424 A1 | 12/2003 | Anderson et al. |
| 2003/0233516 A1 | 12/2003 | Davis et al. |
| 2004/0015599 A1 | 1/2004 | Trinh et al. |
| 2004/0028046 A1 | 2/2004 | Govindarajan et al. |
| 2004/0095936 A1 | 5/2004 | O'Neill et al. |
| 2004/0100950 A1 | 5/2004 | Basu et al. |
| 2004/0100959 A1 | 5/2004 | Relan |
| 2004/0105422 A1 | 6/2004 | Sahni et al. |
| 2004/0190526 A1 | 9/2004 | Kumar et al. |
| 2004/0254909 A1 | 12/2004 | Testa |
| 2004/0258067 A1 | 12/2004 | Irish et al. |
| 2004/0264373 A1 | 12/2004 | Engbersen et al. |
| 2005/0083935 A1 | 4/2005 | Kounavis et al. |
| 2005/0141510 A1 | 6/2005 | Narsinh et al. |
| 2005/0146449 A1* | 7/2005 | Adl-Tabatabai et al. ....... 341/51 |
| 2005/0226235 A1 | 10/2005 | Kumar et al. |
| 2005/0232261 A1 | 10/2005 | Wybenga et al. |
| 2005/0237938 A1* | 10/2005 | Corl et al. ................... 370/235 |
| 2006/0050690 A1 | 3/2006 | Epps et al. |
| 2006/0083247 A1 | 4/2006 | Mehta |
| 2006/0195896 A1 | 8/2006 | Fulp et al. |
| 2006/0218167 A1 | 9/2006 | Bosley et al. |
| 2006/0221954 A1 | 10/2006 | Narayan et al. |
| 2006/0221956 A1 | 10/2006 | Narayan et al. |
| 2006/0221967 A1 | 10/2006 | Narayan et al. |
| 2007/0008962 A1 | 1/2007 | Basu et al. |
| 2007/0070900 A1 | 3/2007 | Heink et al. |
| 2007/0071233 A1 | 3/2007 | Zak |
| 2007/0115986 A1 | 5/2007 | Shankara |
| 2007/0133593 A1 | 6/2007 | Shankara |
| 2007/0234005 A1 | 10/2007 | Erlingsson et al. |
| 2007/0283045 A1 | 12/2007 | Nguyen et al. |
| 2008/0052300 A1 | 2/2008 | Horgan |
| 2008/0162698 A1 | 7/2008 | Hopen et al. |
| 2008/0177812 A1 | 7/2008 | Brandle |
| 2008/0186974 A1 | 8/2008 | Singh et al. |
| 2008/0205403 A1 | 8/2008 | Akyol et al. |
| 2008/0205405 A1 | 8/2008 | Corl et al. |
| 2008/0212586 A1 | 9/2008 | Wang et al. |
| 2008/0228798 A1 | 9/2008 | Van Lunteren |
| 2009/0196297 A1 | 8/2009 | Jabr |
| 2010/0040067 A1 | 2/2010 | Hao et al. |
| 2010/0080224 A1 | 4/2010 | Panwar et al. |
| 2010/0083345 A1 | 4/2010 | Panwar et al. |
| 2011/0134916 A1 | 6/2011 | Panwar et al. |
| 2011/0200038 A1 | 8/2011 | Panwar et al. |

OTHER PUBLICATIONS

Itamar Elhanany et al. "High-performance Packet Switching Architectures" Springer Science & Business Media, ISBN-10: 184628273X, 2002, Chapter 10, 20 pages.

Office Action mailed Feb. 17, 2010 for U.S. Appl. No. 12/242,168 (12 pages).

Office Action mailed Apr. 23, 2010 for U.S. Appl. No. 12/347,495 (11 pages).

Office Action mailed Feb. 16, 2010 for U.S. Appl. No. 12/242,172 (11 pages).

Office Action mailed Jun. 10, 2010 for U.S. Appl. No. 12/242,278, filed Sep. 30, 2008 (24 pages).

U.S. Appl. No. 12/242,125, filed Sep. 30, 2008, entitled "Methods and Apparatus for Range Matching During Packet Classification Based on a Linked-Node Structure" (39 pgs).

U.S. Appl. No. 12/242,278, filed Sep. 30, 2008, entitled "Methods and Apparatus to Implement Except Condition During Data Packet Classification" (35 pgs).

U.S. Appl. No. 12/794,175, filed Jun. 4, 2010 entitled "Methods and Apparatus Related to Packet Classification Based on Range Values" (42 pgs).

U.S. Appl. No. 12/242,158, filed Sep. 30, 2008 entitled "Methods and Apparatus for Producing a Hash Value Based on a Hash Function" (37 pgs).

U.S. Appl. No. 12/347,495, filed Dec. 31, 2008 entitled "Methods and Apparatus for Packet Classification Based on Multiple Conditions" (40 pgs).

U.S. Appl. No. 12/347,499, filed Dec. 31, 2008 entitled "Methods and Apparatus for Packet Classification Based on Multiple Conditions" (41 pgs).

U.S. Appl. No. 12/347,418, filed Dec. 31, 2008 entitled "Methods and Apparatus for Indexing Set Bit Values in a Long Vector Associated with a Switch Fabric" (35 pgs).

Office Action mailed Sep. 2, 2010 for U.S. Appl. No. 12/242,168 (5 pages).

U.S. Appl. No. 12/874,681, filed Sep. 2, 2010 entitled "Methods and Apparatus for Range Matching During Packet Classification Based on a Linked-Node Structure" (42 pgs).

Office Action mailed May 24, 2011 for U.S. Appl. No. 12/874,681, filed Sep. 2, 2010 (7 pages).

(56) References Cited

OTHER PUBLICATIONS

U.S. Appl. No. 13/097,770, filed Apr. 29, 2011, entitled "Methods and Apparatus Related to Packet Classification Associated With a Multi-Stage Switch " (33 pages).

Final Office Action mailed Oct. 13, 2010 for U.S. Appl. No. 12/347,495 (14 pages).

Office Action mailed Mar. 22, 2011 for U.S. Appl. No. 12/347,495, filed Dec. 31, 2008 (11 pages).

Office Action mailed Sep. 26, 2011 for U.S. Appl. No. 12/242,278, filed Sep. 30, 2008.

* cited by examiner

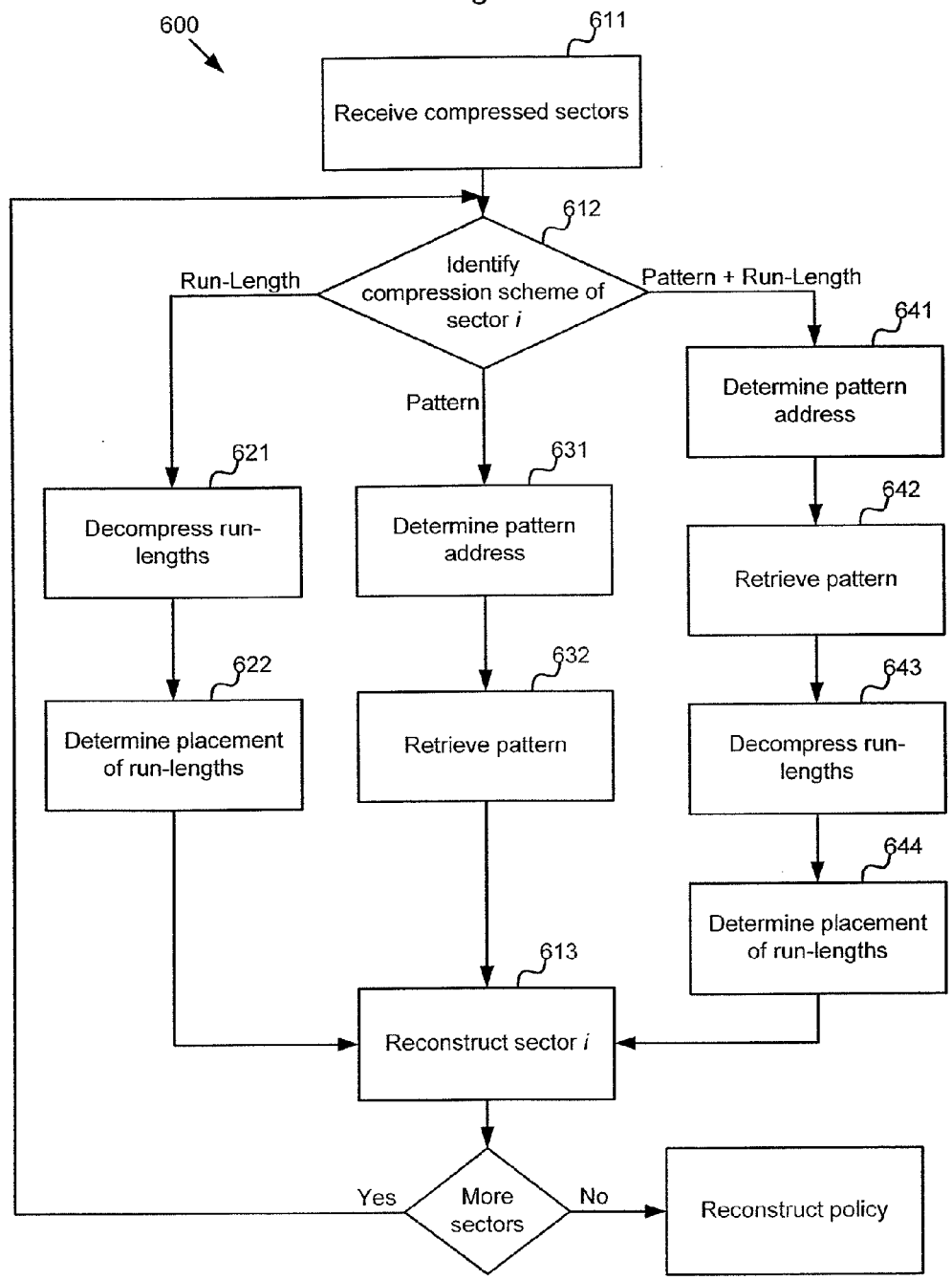

METHODS AND APPARATUS FOR COMPRESSION IN PACKET CLASSIFICATION

BACKGROUND

Embodiments relate generally to methods and apparatus to implement compression and decompression of policies including, for example, hardware decompression of policy vectors associated with policies and represented by bit vectors.

Policies including conditions and instructions (or actions) are used in, for example, packet classification and packet routing. Known policies are often represented as text files or described in a markup language within a text file. Representations of such policies can be stored in a memory of a packet classification appliance or device, but policies often occupy a significant portion of the memory of such a packet classification device.

Compression schemes for reducing the amount of memory occupied by a policy are known, but suffer several disadvantages. For example, compression of known representations of policies is difficult to implement in hardware-based packet classification devices due to memory, size, and logic constraints in hardware-based packet classification devices. Because such compression is difficult to implement in hardware-based classification device, benefits of hardware-based devices have not been realized in many packet classification devices. Thus, a need exists for improved methods and apparatus for improved policy classification in packet classification devices.

SUMMARY OF THE INVENTION

In one embodiment, a method includes receiving a policy vectors associated with a switch fabric, determining a compression scheme, and producing a compressed vector based on the policy vector and the compression scheme. The policy vector is represented by a bit sequence and has a plurality of policy bit values. A policy bit value from the plurality of policy bit vales is configured to trigger an action associated with a data packet in the switch fabric. The compression scheme is determined based on a portion of the policy vector.

BRIEF DESCRIPTION OF THE DRAWINGS

FIG. 7 is a flowchart of another process for decompressing a policy vector, according to an embodiment.

DETAILED DESCRIPTION

Figure 1:
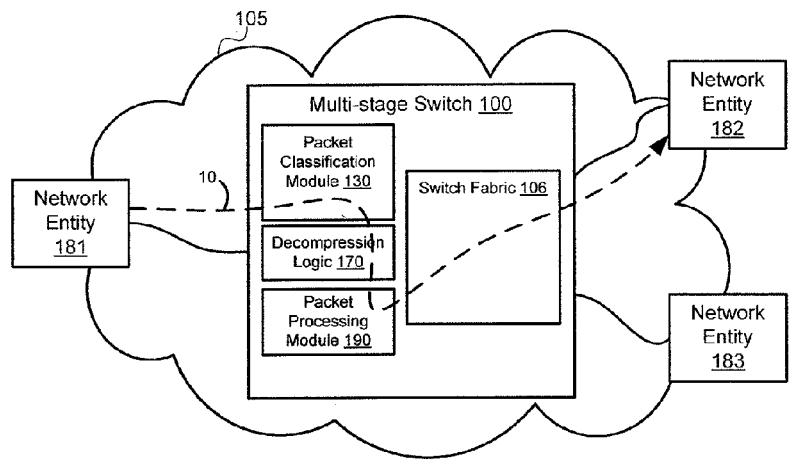
FIG. 1 is a system block diagram of a network including a multi-stage network switch, according to an embodiment.

A packet classification module at a multi-stage switch can be configured to classify a data packet (e.g., an Internet Protocol ("IP") packet, a session control protocol packet, a media packet) received at the multi-stage switch from a network entity. Classifying can include any processing performed so that the data packet can be processed at the multi-stage switch based on a policy. In some embodiments, the policy can include one or more conditions that are associated with one or more instructions that can be executed at the multi-stage switch. For example, one or more portions (e.g., a field, a payload, an address portion, a port portion) of the data packet can be analyzed or processed by the packet classification module based on one or more conditions defined within a policy. When a condition is satisfied by, for example, a data set included in a portion of a data packet, the data packet can be processed based on one or more instructions associated with the condition. In some embodiments, a portion of a data packet can be referred to as a facet.

In some embodiments, a condition can be associated with a policy vector that can include one or more bit values that represent whether or not the condition—when satisfied—triggers an instruction associated with a bit value. In some embodiments, a policy vector can be referred to as a facet cover vector. In some embodiments, a condition can be related to a prefix length of an address value and/or a range of port values. The condition can be satisfied, for example, when a port value included in a data packet falls within a range of port values specified by the condition. In some embodiments, this type of condition can be referred to as a match condition or as a filter condition. In some embodiments, an instruction associated with a condition can be related to, for example, routing of a data packet through a switch fabric of a multi-stage switch. In some embodiments, an instruction can be associated with multiple conditions. In other words, a particular processing or routing action at a multi-stage switch can be triggered when any one of a number of conditions are satisfied.

In some embodiments, instructions related to a condition can be represented by bit elements of a policy vector represented by a bit vector. In some embodiments, a policy vector can be encoded or compressed when stored in a memory configured as a database for policy vectors, and decompressed for use in a multi-stage switch. For example, a memory configured as a database for policy vectors can store compressed policy vectors to increase the number of policy vectors stored in the database (also referred to a policy vector density of the memory or database), and to increase the throughput of policy vectors in a data bus in communication with the memory (also referred to as policy vector throughput of the memory or database). The compressed policy vectors can be decompressed by a decompression logic module within a multi-stage switch for use in a packet processing module within the multi-stage switch. In some embodiments, a policy vector can be separated into sectors and each sector compressed. A decompression logic module can include multiple parallel sector decompression logic modules configured to decompress each compressed sector of a policy vector substantially simultaneously.

In some embodiments, policy vectors can be compressed and decompressed based on a variety of compression or encoding schemes. For example, one policy vector can be compressed based on a run-length compression, and another policy vector can be compressed based on storing a bit pattern from the policy vector in a memory and encoding the address value of the bit pattern in the memory as the policy vector. In some embodiments, a policy vector is compressed based on a best or optimum compression scheme for a sequence of bit elements of the policy vector. In some embodiments, a compressed or encoded policy vector includes a compression or encoding scheme identifier. The compression scheme identifier can be used by a decompression logic module to determine which compression scheme is will decompress the policy vector.

FIG. 1 is a system block diagram of a network including a multi-stage network switch, according to an embodiment. Network entity 181, network entity 182, and network entity 183 are operatively coupled via network 105. Network 105 includes multi-stage switch 100. Multi-stage switch 100 is configured to receive data packets from network entity 181, network entity 182, and network entity 183 and route the data packets to another network entity.

Multi-stage network switch includes packet classification module 130, decompression logic 170, packet processing module 190, and switch fabric 106. Packet classification module 130 is configured to receive a portion of a data packet received by multi-stage network 100, classify the data packet based on the portion of the data packet, and provide a compressed policy vector to decompression logic 170. Decompression logic 170 includes logic devices and/or a processor configured to decompress compressed policy vectors, and provide the policy vectors to packet processing module 190. Packet processing module 190 is configured to receive a policy vector from decompression logic 170 and determine one or more instructions to route the data packet through switch fabric 106 based on the policy vector. More details related to packet classification modules are set forth in co-pending patent application Ser. No. 12/242,168, filed on Sep. 30, 2008, and entitled "Methods and Apparatus Related to Packet Classification Associated with a Multi-Stage Switch," which is incorporated herein by reference in its entirety.

In some embodiments, switch fabric 106 can be a switch core of a data center that has multiple stages (e.g., an ingress stage, an egress stage, a middle stage) through which data can be routed. In some embodiments, a switch core can be defined based on a Clos network architecture (e.g., a non-blocking Clos network, a strict sense non-blocking Clos network, a Benes network). In some embodiments, a network architecture such as, for example, a Clos network and/or a Benes network can be reconfigurable (e.g., rearrangeable). In some embodiments, a switch core can be defined by one or more multi-stage switches (not shown) that each include one or more switch fabrics.

For example, path 10 illustrates the path of a data packet from network entity 181 to network entity 182 through network 105. Network entity 181 sends a data packet including a destination address value associated with network entity 182. The data packet is received at multi-stage switch 100 and a portion of the data packet including the destination address value is passed to packet classification module 130. Packet classification module 130 receives the data packet and classifies the data packet based on the destination address value. More specifically, for example, packet classification module 130 can determine a compressed policy vector based on the destination address value. Said another way, packet classification module 130 provides a compressed policy vector associated with a condition matched or satisfied by the destination address value. Packet classification module 130 sends the compressed policy vector to decompression logic 170. In some embodiments, the compressed policy vector is represented by signals on, for example, a signal bus. Decompression logic 170 receives the compressed policy vector and decompresses the compressed policy vector. In some embodiments, decompression logic 170 is stateless (or memory-less) logic configured to decompress a policy vector as signals representing the policy vector propagate through decompression logic 170. In some embodiments, decompression logic 170 includes a processor or memory configured to decompress a policy vector based on signals representing the policy vector received by the processor. In some embodiments, the processor or controller is operatively coupled to a memory configured to store a portion of a compressed and/or decompressed policy vector.

Decompression logic 170 provides the decompressed policy vector to packet processing module 190. The decompressed policy vector is configured to indicate one or more instructions associated with a condition satisfied by the destination address value based on a policy. Packet processing module 190 receives the policy vector and determines one or more instructions associated with the satisfied condition indicated in the policy vector. Packet processing module 190 provides the instructions to switch fabric 106 to route the data packet to network entity 182.

In some embodiments, packet processing module 190 can provide the instructions to a controller module within multi-stage switch 100 operatively coupled to switch fabric 100 and configured to control the routing of data packets through switch fabric 106. In some embodiments, packet processing module 190 is configured to control the routing of data packets of through switch fabric 106 directly. For example, by providing signals associated with routing actions in switch fabric 106.

Figure 2:
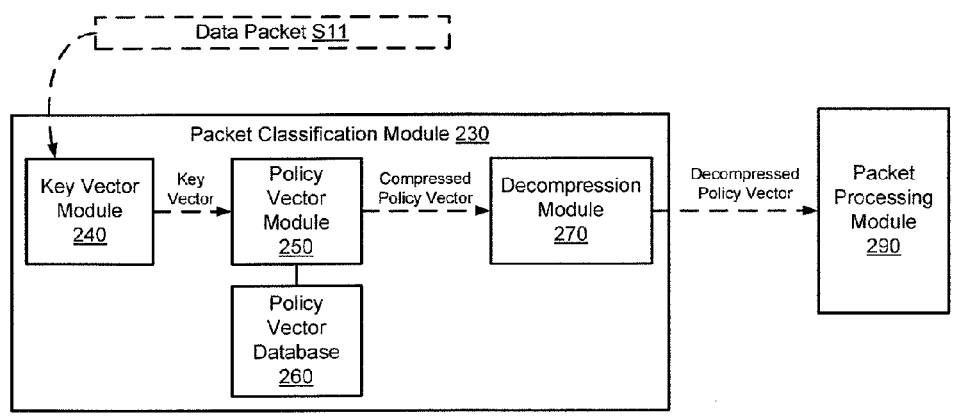
FIG. 2 is a system block diagram of a packet classification and processing system, according to an embodiment.

FIG. 2 is a system block diagram of a packet classification and processing system, according to an embodiment. As illustrated in FIG. 2, packet classification module 230 includes key vector module 240, policy vector module 250, policy vector database 260, and decompression module 270. Key vector module 240 is operatively coupled to policy vector module 250, which is operatively coupled to policy vector database 260 and decompression module 270.

Key vector module 240 is configured to determine a key vector based on a portion of data packet S11. In some embodiments, a key vector can be an address value such as a destination address value or source address value in an IP data packet. In some embodiments, a key vector can be a port value such as a source port value or a destination port value of an IP data packet. In some embodiments, a key vector can be a composite of a port value and a protocol identifier. For example, a tuple representing a protocol identifier with the transport control protocol ("TCP") or user/universal datagram protocol ("UDP") and a source port value. In some embodiments, a key vector module can produce two or more keys, each associated with a different portion of a data packet.

The key vector is provided by key vector module 240 to policy vector module 250. Policy vector module 250 produces a compressed policy vector associated with the data packet based on the key vector. In some embodiments, a policy vector module can produce a compressed policy vector associated with an address value portion of a data packet based on a hash function. More details related to hash functions in packet classification are set forth in co-pending patent application Ser. No. 12/242,154, filed on Sep. 30, 2008, and entitled "Methods and Apparatus Related to Packet Classification Based on Range Values," and in co-pending patent application Ser. No. 12/242,158, filed on Sep. 30, 2008, and entitled "Methods and Apparatus for Producing a Hash Value Based on a Hash Function," both of which are incorporated herein by reference in their entireties. In some embodiments, a policy vector module can produce a compressed policy vector associated with a port value of a data packet based on a linked-node function or structure. More details related to linked-node structures and functions in packet classification are set forth in co-pending patent application Ser. No. 12/242,125, filed on Sep. 30, 2008, and entitled "Methods and Apparatus for Range Matching During Packet Classification Based on a Linked-Node Structure," which is incorporated herein by reference in its entirety.

In some embodiments, policy vector module 250 is operatively coupled to policy vector database 260. Policy vector database 260 can be, for example, a memory configured to store and/or provide access to a table or database of compressed policy vectors. In some embodiments, the memory can be a solid state memory co-located on a chip such as, for example, an application specific integrated circuit ("ASIC") or field programmable gate array ("FPGA") including circuitry and/or logic configured as a key vector module and/or policy vector module. In other embodiments, a memory can be a discrete memory element located on a common circuit board or attachable to a circuit board including circuitry and/or logic configured as a key vector module and/or policy vector module. In some embodiments, a policy vector database can be located remotely from a policy vector module. For example, a policy vector module can include a communications interface such as a serial, parallel, or network interface for communicating with a policy vector database.

The compressed policy vector is received and decompressed at decompression module 270. In some embodiments, decompression module 270 can be decompression logic configured to decompress compressed policy vectors. In some embodiments, decompression logic is stateless (or memory-less) logic configured to produce decompression signals representing compressed policy vectors as the signals propagate through the decompression logic. In some embodiments, decompression module 270 includes a processor or controller configured to receive and decompress compressed policy vectors. In some embodiments, the processor or controller is operatively coupled to a memory configured to store a portion of a compressed and/or decompressed policy vector.

Decompression module 270 is operatively coupled to packet processing module 290 and configured to provide decompressed policy vectors to packet processing module 290. As discussed above, packet processing module 290 is configured to interpret decompressed policy vectors and provide instructions such as, for example, routing instructions to a switch fabric based on a policy vector.

In some embodiments, two or more of key vector module 240, policy vector module 250, and decompression module 270 are integrated modules. In some embodiments, key vector module 240, policy vector module 250, and decompression module 270 are directly operatively coupled one to another. In some embodiments, packet classification module 230 includes a processor or controller configured to receive and/or pass or direct signals from one or more of key vector module 240, policy vector module 250, and decompression module 270 to another of key vector module 240, policy vector module 250, and decompression module 270. In some embodiments, packet classification module includes other components such as multiplexers and/or memories.

In some embodiments, packet classification module 230 can include multiple key vector modules, policy vector modules, and/or decompression modules. For example, multiple key vector modules, policy vector modules, and/or decompression modules can be configured to classify a data packet based on two or more portions or facets of the data packet in parallel. In one embodiment, for example, a packet classification module can include four key vector modules, four policy vector modules, and four decompression modules, where each key vector module is uniquely operatively coupled to a policy vector module, and each policy vector module is uniquely operatively coupled to a decompression module. The packet classification module classifies a packet based on four portions, for example, a source address value, a destination address value, a source port value, and a destination port value of the data packet. In some embodiments, the classification based on each portion of the data packet occurs substantially simultaneously with the classifications based on each of the other portions of the data packet.

Figure 3A:
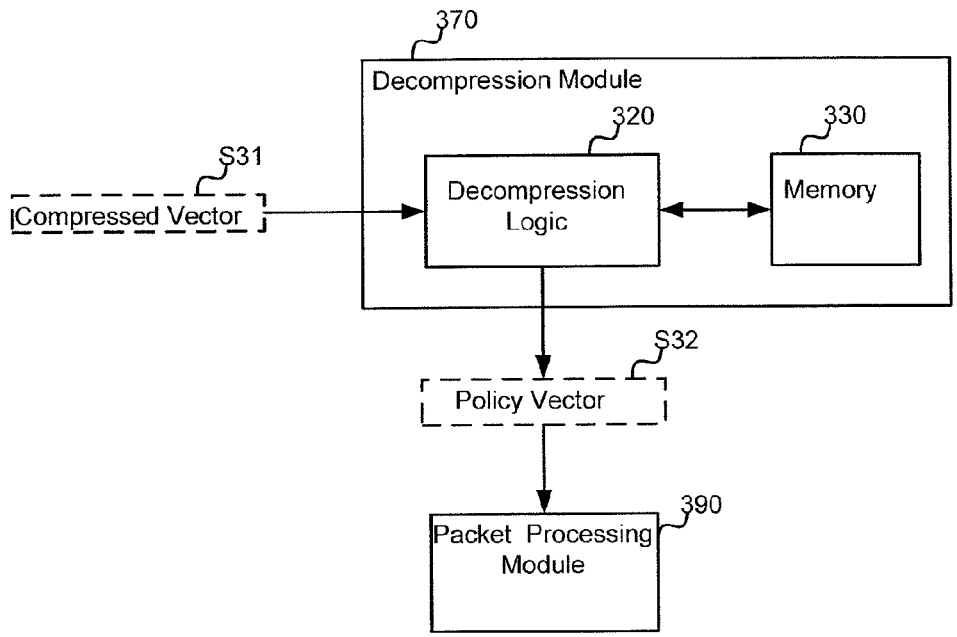
FIGS. 3A and 3B are a schematic block diagram of a decompression module including a memory, according to an embodiment.
Figure 3B:
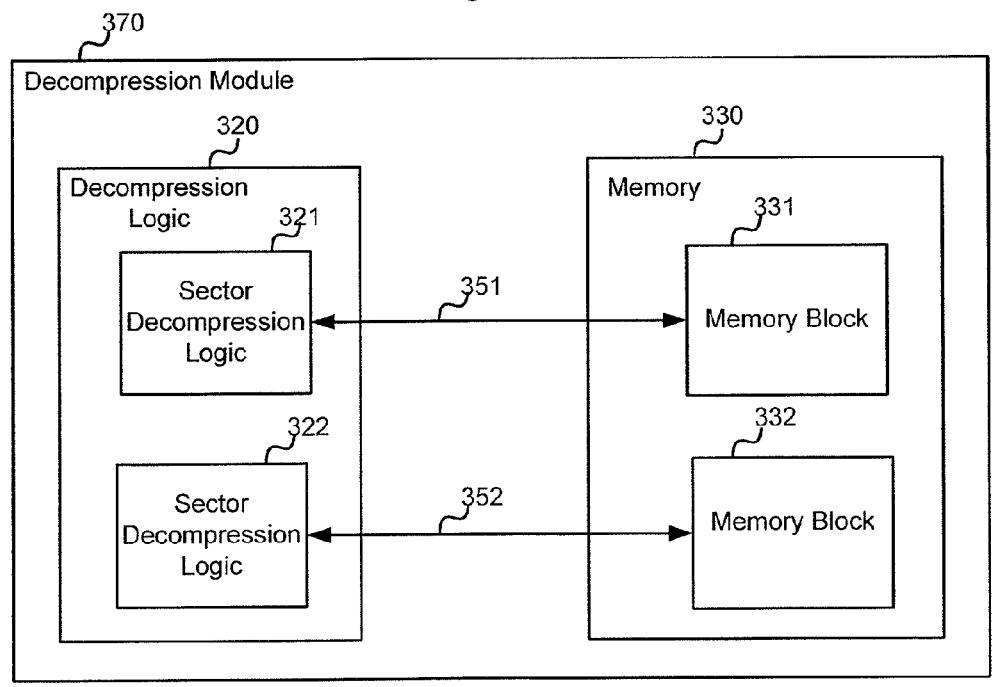

FIGS. 3A and 3B are a schematic block diagram of a decompression module including a memory, according to an embodiment. As illustrated in FIG. 3A, decompression module 370 includes decompression logic 320 operatively coupled to memory 330. Memory 330 is configured to store a portion of a policy vector referenced or addressed by a compressed policy vector. Decompression logic receives compressed policy vector S31 and produces policy vector S32, which includes a portion of a policy vector stored in memory 330. Policy vector S32 is an uncompressed policy vector represented by compressed policy vector S31 and is provided to packet processing module 390.

In one embodiment, memory 330 is configured to store a bit pattern of a policy vector at a memory address location represented by a memory address value encoded in compressed policy vector S31. Decompression logic 320 is configured to access bit pattern in the memory address location represented by the memory address value encoded in compressed policy vector S31 and include the bit pattern in policy vector S32.

In some embodiments, compressed policy vector S31 includes an indicator of a compression scheme used to compress policy vector S32 represented by compressed policy vector S31. The indicator can be, for example, a bit value indicating a run-length compression or an address-encoding compression. Decompression logic 320 can determine a compression scheme based on the indicator. For example, if the indicator is of an address-encoding compression, decompression logic 320 can access memory 330 and retrieve a pattern to be used in decompressing compressed policy vector S31. If the indicator is of a run-length compression, decompression logic 320 can decompress compressed policy vector S31 based on information related to a the run-length compression included in compressed policy vector S31.

A run-length compression scheme can be, for example, a compression of a portion of a policy vector represented by a bit vector based on a repeated bit value such as a '1' bit value. For example, a policy vector can be compressed by recording the location within the policy vector of the first element having a repeated bit value (or start of the run) and the number of times the value is repeated (or length of the run). Run-length compression can be particularly useful for sparse policy vectors such as policy vectors having many vector elements of a one value and only few vector elements of another value. In some embodiments, the start of the run and the run length is recorded for the more prevalent value in the policy vector. In some embodiments, the start of the run and the run length for the less prevalent value in the policy vector.

An address-encoding compression scheme can include, for example, storing a pattern of values from a policy vector at a location in a memory and encoding the memory address value of the location in memory within a compressed policy vector. An address-encoding compression scheme can be particularly applicable in compression of policy vectors when other forms of compression such as, for example, run-length compression yield a low compression ratio for a policy vector (i.e., when other compression scheme poorly compress a particular policy vector or class of policy vectors).

In some embodiments, decompression logic can be configured to decompress multiple policy vectors or multiple portions of a policy vector in parallel or substantially simultaneously. FIG. 3B is an illustration of decompression logic and a memory configured to decompress multiple sectors of a policy vector in parallel, according to an embodiment. Decompression module 370 include decompression logic 320 and memory 330. Decompression logic 320 includes sector decompression logic 321 and sector decompression logic 322. Sector decompression logic 321 and sector decompression logic 322 are configured to decompress different compressed sectors or portions of a policy vector in parallel.

Sector decompression logic 321 is operatively coupled to memory block 331 of memory 330. Memory block 331 is configured to store portions of policy vectors such as, for example, bit patterns in sectors of policy vectors that will be decompressed by sector decompression logic 321. Similarly, sector decompression logic 322 is operatively coupled to memory block 332 of memory 330. Memory block 332 is configured to store portions of policy vectors such as, for example, bit patterns in sectors of policy vectors that will be decompressed by sector decompression logic 332.

In some embodiments, a decompression module can include additional sector decompression logic and/or memory block configured to decompress additional sectors of a policy vector. For example, in some embodiments, a policy vector is separated into twelve sectors and each of the twelve sectors is individually compressed. The compressed sectors of the policy vector are stored in a memory and accessed by a policy vector module in response to a key vector based on a portion of a data packet. The twelve compressed sectors are provided to a decompression module and decompressed in parallel one with anther. In other words, the compressed sectors are decompressed simultaneously or substantially simultaneously.

In some embodiments, the decompressed sectors are combined such that the policy vector is reconstructed before being provided to a packet processing module. For example, decompressed sectors of a policy vector can be concatenated one to another to reconstruct a policy vector. In some embodiments, a packet processing module can reconstruct a policy vector based on uncompressed sectors of a policy vector.

Figure 4:
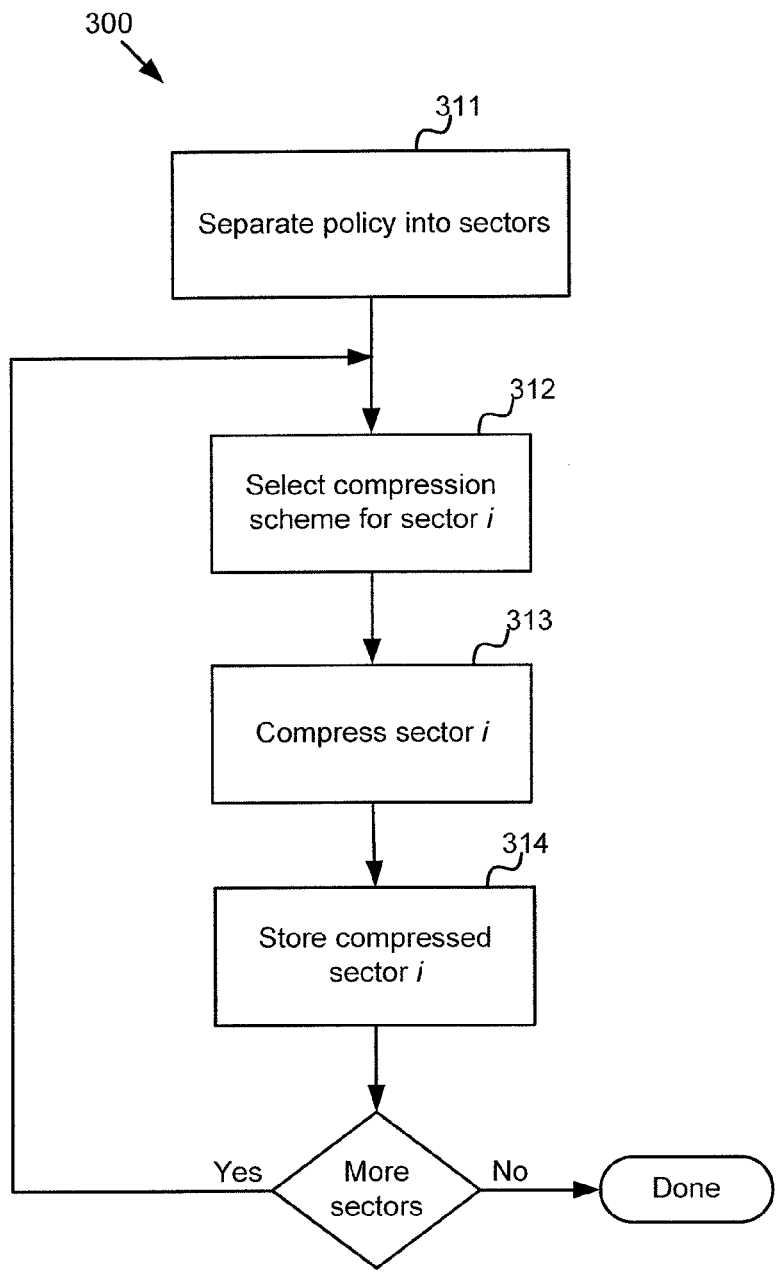
FIG. 4 is a flowchart of a process for compressing a policy vector, according to an embodiment.

FIG. 4 is a flowchart of process 300 for compressing a policy vector, according to an embodiment. A policy vector is separated into sectors, at 311. For example, a policy vector represented by a 1304-bit vector can be separated into 16 64-bit sectors. In some embodiments, a policy vector can be separated into sectors to achieve a higher compression ratio. In some embodiments, a policy vector can be separated into sectors to enable the policy vectors to be sent and received in parallel over a bus connecting two or more components of a network appliance such as, for example, a multi-stage switch. In some embodiments, a policy vector can be separated into sectors based on a memory block size. For example, a policy vector can be separated into sectors such that each sector when compressed and/or decompressed does not exceed a width of a memory block.

After the policy vector is separated into sectors, each sector is compressed. At 312, a compression scheme is selected for a sector. The compression scheme can be selected from one or more compression schemes based on the values of elements of the sector. In some embodiments, a compression scheme can be based on a series of policy vector elements having a common value, or a run-length compression scheme. For example, a 64-bit policy vector sector having a sequence of 8 bit values of '1' beginning at bit 5 and all other bits being '0' can be represented as a 6-bit value representing the run length, 8 bits, of the sequence and a 6-bit value representing the starting position of the run length, 5. Thus, a 64-bit policy vector sector can be represented with a 12-bit value. In other words, based on this compression scheme, the 64-bit bit vector 00001111 11110000 00000000 00000000 00000000 00000000 00000000 00000000 can be represented by 001000 000101.

In some embodiments, a compression scheme can be based on a pattern in the sector, or a pattern compression. For example, a 64-bit policy vector sector can have a sequence of all 64 bit elements alternating with values of '1' and '0'. This pattern can be stored at an address location in a memory and an address value of the location in memory can be included or encoded in a compressed policy vector sector. For example, a pattern can be stored in 64-bit wide memory block with 4K to 4,096 elements and the 12-bit address representing the location of the pattern in memory can be the compressed sector. In some embodiments, the memory can be accessible to or integrated with a decompression module configured to decompress compressed policy vector sectors.

In some embodiments, a compression scheme can be a combination of a run-length compression and a pattern compression. In other words, a portion of a policy vector sector can be compressed based on a pattern compression and another portion of the policy vector sector can be compressed based on a run-length compression. For example, a portion of a sector that can be effectively compressed based on a run-length compression can be compressed based on a run-length compression, and another portion of the sector can be compressed based on a pattern compression.

In other embodiments, other compression schemes can be used alone or in combination with a run-length compression and/or a pattern compression. For example, a run-length compression scheme based on pairs or sets of bits can be a compression scheme.

In some embodiments, at 312 analyzing a sector is also performed to determine an optimum compression scheme for a sector. An optimum compression scheme can be determined based on, for example, a compression ratio, complexity of the compression and/or decompression, and/or speed of the compression and/or decompression of the sector based on a give compression scheme. In some embodiments, analysis can include compressing the sector based on two or more compression schemes and selecting the optimum compression scheme. In some embodiments, the analysis is based on statistical or probabilistic analysis of the sector.

The sector is compressed at 313 after the compression scheme has been selected. In some embodiments, as discussed above, a sector can be compressed as part of the process at 312 and, thus, the process at 313 can be integrated into the process at 312. In some embodiments, the sector is compressed in a hardware module or compressor. In some embodiments, a hardware compressor can be optimized to compress a sector based on a compression scheme and can be selected from two or more hardware selectors based on the compression scheme selected at 312. In some embodiments, a hardware compression can be operatively coupled to a processor or computer configured to separate a policy vector into sectors and select a compression scheme for the sector.

In some embodiments, a portion of a compressed sector represents an compression scheme type. For example, a compressed sector can include a 2-bit value where '11' represents a run-length compression scheme, '01' represents a pattern compression scheme, and '10' represents a combined compression scheme.

The compressed sector is stored, at 314. In some embodiments, the compressed sector is provided or transmitted from a processor or computer performing the compressing to a network appliance such as, for example, a multi-stage switch to be included in a policy vector database within the multi-stage switch. A policy vector database can be, for example, a memory configured to store compressed policy vectors. In some embodiments, compressed sectors are stored in a database of policy vectors external to a multi-stage switch. For example, a policy vector database can be a memory such as a magnetic or solid-state hard drive operatively coupled to a processor in communication with the multi-stage switch such that the multi-stage switch can access or request the compressed sectors located in the database.

In some embodiments, storing a compressed sector includes updating one or more of a hash table, filter, linked-node structure, and/or other function or table. For example, an index value or address value of a memory location or database reference of the sector can be updated in a hash table or linked-node structure. In some embodiments, a policy vector (and sectors thereof) is related to or associated with a range of IP address values. Entries in a hash table can be updated and/or added such that subsequent lookups or searches in the hash table based on an IP address value can result in an index value associated with the sector. Similarly, a node related to a policy vector and including an index value of a sector can be added to or updated in a linked-node structure such that subsequent searches or traversals of the linked-node structure based on the IP address value can result in an index value associated with the sector.

After a sector is compressed, if there are more sectors to be compressed, the process at 312 is repeated for the next sector. If all the sectors of a policy vector have been compresses, process 300 is complete. In some embodiments, the sectors of a policy vector can be compressed in parallel one with other. For example, a hardware compression engine can be configured to compress multiple sectors simultaneously or substantially simultaneously based on a bank of parallel compressors. In some embodiments, each sector can be compression sequentially as illustrated in FIG. 4. For example, a processor executing software and/or firmware instructions can sequentially compress each sector. In some embodiments, sectors are compressed in parallel and sequentially. For example, a compression engine can include parallel compression modules and each compression module can compress sectors sequentially.

In some embodiments, a sector can be represented by multiple compressed sector. For example, a sector can be represented by two compressed sectors each representing a run-length in the sector. In some embodiments, a combined compression scheme can include a compressed sector representing a pattern and one or more compressed sectors representing run-lengths collectively compressing and/or representing a single sector.

In some embodiment, process 300 can include additional steps, fewer steps, and/or be rearranged. For example, in some embodiments, compressed sectors are not stored in a memory until all the sectors of a policy vector are compressed.

Figure 5:
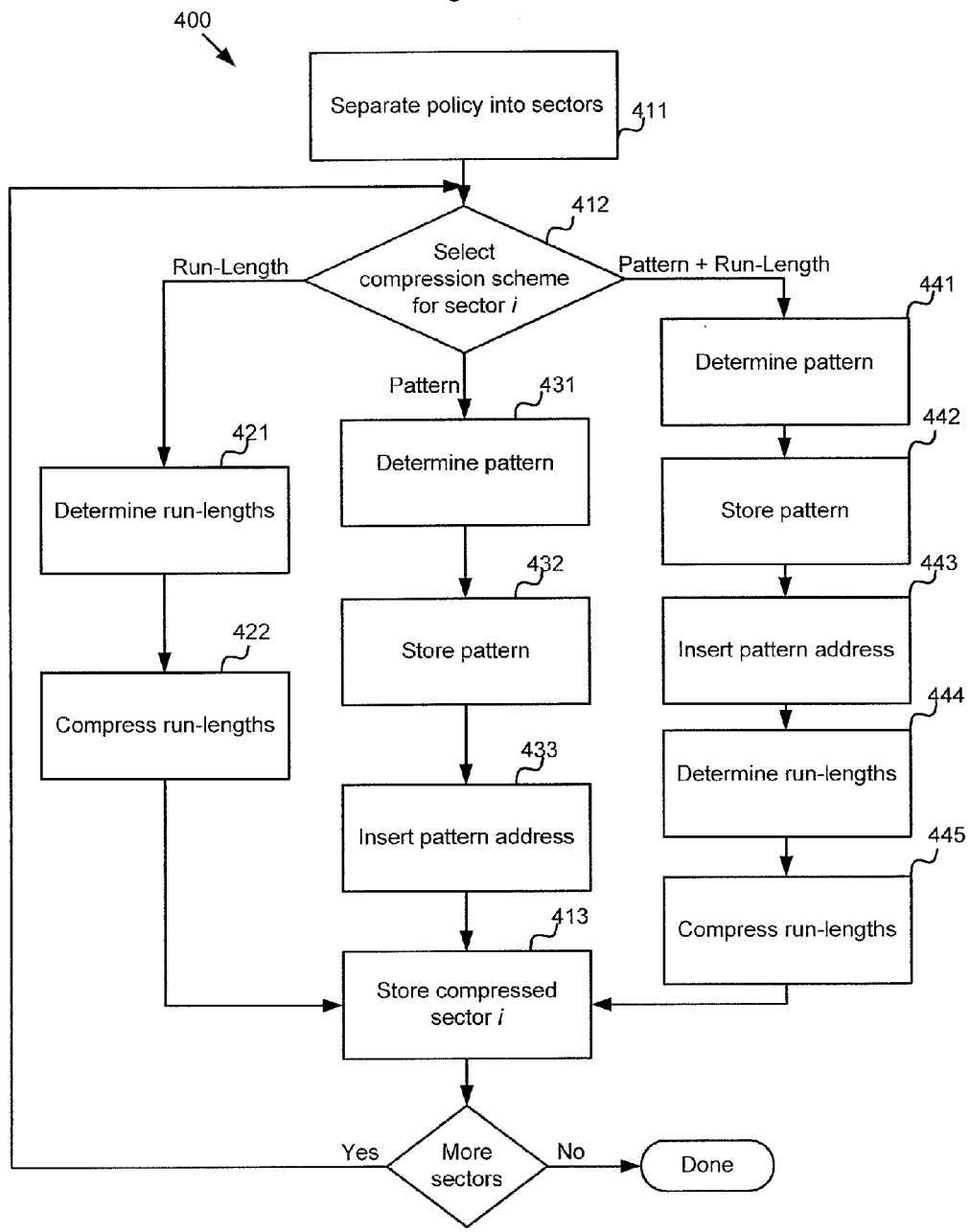
FIG. 5 is a flowchart of another process for compressing a policy vector, according to an embodiment.

FIG. 5 is a flowchart of process 400 for compressing a policy vector, according to an embodiment. As illustrated in FIG. 5, a policy vector is separated into sectors, at 411, and process 400 varies based on a compression scheme selected based on a sector, at 412. If a run-length compression scheme is selected, a run-length is determined, at 421, and the run-length data or information is compressed or encoded in a compressed sector, at 422.

If, at 412, a pattern compression scheme is selected, a pattern is determined, at 431; the pattern is stored, for example, in a memory or database, at 432; and an address value associated with a location of the pattern in the memory is included in the compressed sector, at 433. If, at 412, a combined compression scheme (pattern and run-length) is selected, a pattern is determined, at 441; the pattern is stored, at 442; an address value associated with a location of the pattern in the memory is included in the compressed sector, at 443; run-lengths in the sector are determined, at 444; and the run-lengths are compressed or encoded in a compressed sector, at 445.

At 413, a compressed sector is stored, and process 400 returns to 412 and a compression scheme for the next sector is selected; or if all sectors have been compressed, process 400 ends. In some embodiments, process 400 can be applied to each sector of a policy vector in parallel. In some embodiments, steps can be added to, removed from or rearranged in process 400. For example, if a combined compression scheme is selected, the run-length compression can be processed before the pattern compression. In some embodiments, a compression scheme can be repeated multiple times to compress a single sector. For example, a single sector can be compressed as three or more run-length compressed sectors. In some embodiments, compressed sectors in a group of compressed sectors representing a sector include an indication of their relationship within the group. For example, the first compressed sector in the group can include a field or portion of the compressed sector with a value indicating that it is the first compressed sector, the second compressed sector can include a field or portion of the compressed sector with a value indicating that it is the second compressed sector, and the last compressed sector can include a field or portion of the compressed sector with a value indicating that it is the last compressed sector. This value can be useful, for example, during decompression of the sector.

Figure 6:
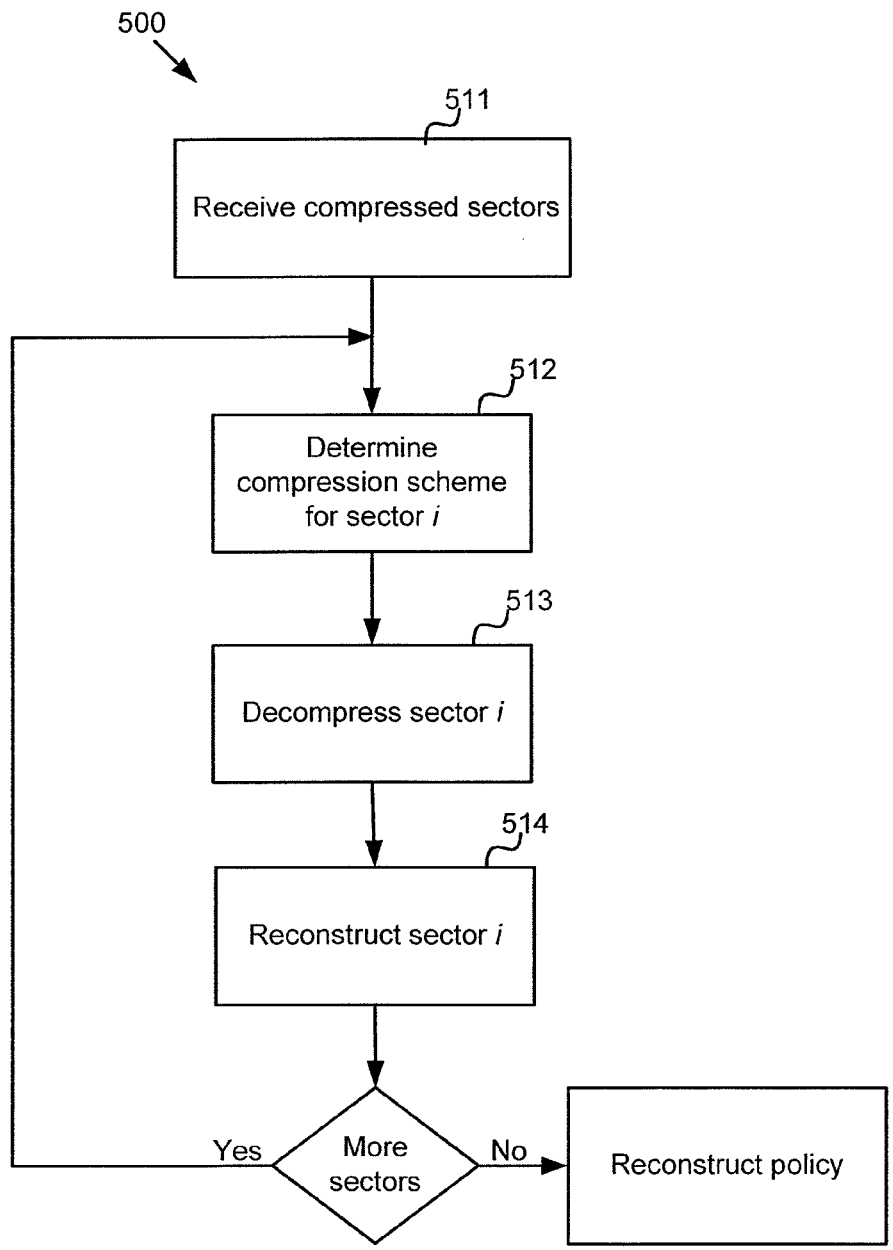
FIG. 6 is a flowchart of a process for decompressing a policy vector, according to an embodiment.

FIG. 6 is a flowchart of process 500 for decompressing a policy vector, according to an embodiment. Compressed sectors of a policy vector are received or accessed, at 511. In some embodiments, the compressed sectors of a policy vector are retrieved from a database of compressed policy vectors based on an index or address value received from a hash table, hash function or linked-node structure. After the compressed sectors are received, a compression scheme of each sector is determined, at 512. In some embodiments, a sector is represented by multiple compressed sectors and a compression scheme of each compressed sector is determined, at 512. In some embodiments, a compression scheme for a group of compressed sectors representing a sector can be indicated by a value within a field of a first compressed sector in the group of compressed sectors. In some embodiments, a compression scheme can be provided separate from the compressed sectors. For example, a header including information about the compressed sector and/or group of compressed sectors can be provided or accessible to a hardware module configured to decompress compressed sectors. The fields or elements in the header can represent compression schemes of each compressed sector in a group of compressed sectors. In some embodiments, a single header can represent each sector of a policy vector.

At 513, the compressed sector is decompressed based on the compression scheme determined (at 512). In some embodiments, a group of compressed sectors representing a single compressed sector is decompressed one compressed sector at a time by a single hardware module. In some embodiments, a single hardware module can be configured to include multiple decompression modules or logic in parallel to decompress each compressed sector in a group of compressed sectors at substantially the same time. In some embodiments, all of the compressed sectors and/or groups of compressed sectors representing the sectors of a policy vector are decompressed based on parallel decompression modules in a hardware module.

In some embodiments, a value in a field or parameter of a compressed sector indicates the position of the compressed sector within a group of compressed sectors representing a single sector. A decompression module can interpret or use this value, for example, to determine when an entire sector has been decompressed or to select an optimization for decompressing a group of compressed sectors.

After a sector has been decompressed, the sector is reconstructed, at 514. In some embodiments, a sector represented by a group of compressed sectors can be reconstructed based on a concatenation of the results of the decompression of each compressed sector. In some embodiments, reconstruction of a sector can include a logical combination such as, for example, an OR, AND, or XOR logical combination of the results of the decompression of two or more compressed sectors from a group of compressed sectors representing a sector.

After a sector is reconstructed, process 500 returns to 512 if more sectors are to be decompressed and reconstructs the policy vector if all the sectors have been decompressed. A policy vector can be reconstructed by, for example, properly arranging or concatenating the results of the decompression of each compressed sector to reconstruct the policy vector. For example, the compressed sectors or groups of compressed sectors representing a policy vector can be decompressed in order such that the first compressed sector is related to the first portion of the policy vector and the last compressed sector is related to the last portion of the policy vector.

In some embodiments, the output of each decompression module from a group of decompression modules can be operatively coupled to an input of a hardware module configured to, for example, perform a routing action in a switch fabric based on the policy vector, such that the policy vector is reconstructed at the input of the hardware module. For example, a policy vector can be separated into two sectors and each sector can be represented by a compressed sector. The compressed sectors can be decompressed in separate decompression modules such that the output of each compression module represents one half of the policy vector. The output of the decompression module representing the first half of the policy vector can be operatively coupled to the portion of the input of the hardware module configured to receive the first half of the policy vector, and the output of the decompression module representing the second half of the policy vector can be operatively coupled to the portion of the input of the hardware module configured to receive the second half of the policy vector. Thus, the input of the hardware module can receive the policy vector in a parallel configuration. In some embodiments, decompressed sectors of a policy vector can be provided to a hardware module by one or more decompression modules serially.

Similar to process 300, in some embodiments, the sectors of a policy vector can be decompressed in parallel one with other. For example, a hardware decompression engine or decompression module can be configured to decompress multiple sectors simultaneously or substantially simultaneously based on a bank of parallel decompression modules. In some embodiments, each sector can be decompression sequentially as illustrated in FIG. 6. For example, a processor executing software and/or firmware instructions can sequentially compress each sector. In some embodiments, sectors are decompressed in parallel and sequentially. For example, a decompression engine can include parallel decompression modules and each decompression module can compress sectors sequentially.

FIG. 7 is a flowchart of process 600 for decompressing a policy vector, according to an embodiment. As illustrated in FIG. 7, compressed sectors are received, at 611, and process 600 varies based on a compression scheme identified or determined, at 612, based on a compressed sector. If a run-length compression scheme is selected, run-lengths are decompressed at 621, and the placement or positions of the run-lengths are determined at 622.

If, at 612, a pattern compression scheme is identified, a pattern address value is determined or interpreted, at 631; and, at 632, a pattern is retrieved from a memory based on the pattern address value determined (at 631). If, at 612, a combined compression scheme (pattern and run-length) is identified, a pattern address value is determined or interpreted, at 641; at 642, a pattern is retrieved from a memory based on the pattern address value determined, at 641; run-lengths are decompressed, at 643; and the placement or positions of the run-lengths are determined, at 644.

At 613, a section is reconstructed, and process 600 returns to 612 to select a compression scheme for the next sector or reconstructs the policy vectors if all sectors have been decompressed. In some embodiments, process 600 can be applied to each compressed sector or group of compressed sectors representing a sector of a policy vector in parallel. In some embodiments, steps can be added to, removed from or rearranged in process 600. For example, if a combined compression scheme is selected, the run-length decompression can be processed before the pattern decompression. In some embodiments, a compression scheme can be repeated multiple times to decompress a single sector. For example, a single sector can be decompressed from three or more run-length compressed sectors representing the single sector. Thus, in some embodiments, 621 and 622, for example, can be repeated multiple times for a single sector. In some embodiments, compressed sectors in a group of compressed sectors representing a sector include an indication of their relationship within the group. This indication can be used, accessed, and/or interpreted during decompression, for example, during decompression of a run-lengths to determine when the last compressed sector in the group of compressed sectors has been processed or decompressed.

In some embodiments, a condition can be a range of IP addresses and can be satisfied by a data packet when an IP address included in a portion of the data packet falls within the range of IP address. The condition can be associated with a policy vector including three bit values associated with data packet processing instructions: the first bit value being associated with a data packet forward instruction, the second bit value being associated with a data packet log instruction, and the third bit value being associate with a data packet discard instruction. If the first and second bit values are set and the third bit value is unset, a data packet that has an IP address that satisfies the condition (i.e., falls within the range of IP addresses of the condition) is forwarded and logged at the multi-stage switch. If the second and third bit values are set and the first bit value is unsent, a data packet that has an IP address that satisfies the condition is discarded and logged at the multi-stage switch. Thus, a policy vector can be configured to trigger instructions if a condition associated with the policy vector is satisfied by a data packet.

In some embodiments, a policy can include an except condition. Similar to a condition, an except condition can be associated with an instruction and can be a single value or a range of values. However, when an except condition is satisfied, the associated instruction is not executed at a multi-stage switch. Thus, except conditions can prevent one or more values in a range of values from satisfying a condition. For example, a policy can include a condition that is a range of address values and an except condition that is a subset of the range of address values, each associated with a common instruction. If a data packet received by a multi-stage switch has an address value that falls within the range of address values, but not within the subset of the range of values, the condition is satisfied and the except condition is not. Thus, the instruction associated with the condition and except condition will be executed at the multi-stage switch. If, however, the data packet has an address value that falls within the range of address values and the subset of the range of address values, then the condition and the except condition are satisfied, and the instruction associated with the condition and the except condition is not executed at the multi-stage switch. More details related to conditions such as except conditions and match conditions in packet classification are set forth in co-pending patent application Ser. No. 12/242,278, filed on Sep. 30, 2008, and entitled "Methods and Apparatus to Implement Except Condition During Data Packet Classification," which is incorporated herein by reference in its entirety.

The packet classification module (including any sub-modules and/or memory) can be implemented in hardware. For example, sub-modules of the packet classification module that are configured to process the data packet based on one or more conditions associated with a policy can be implemented in hardware. In addition, sub-modules of the packet classification module that are configured to execute an instruction associated with a policy can be implemented in hardware. In some embodiments, the packet classification module (including sub-modules and memory) can be integrated on a single semiconductor chip. In some embodiments, one or more portions of the packet classification module can be implemented in software, or implemented in a combination of hardware and software.

In some embodiments, a portion of a multi-stage switch can be configured to trigger another portion of the multi-stage switch to execute an instruction associated with a policy. In some embodiments, a multi-stage switch can be configured to trigger, based on a policy vector, execution of an instruction at a separate entity. In some embodiments, a data packet can be processed based on a policy that is associated with a group of data packets. In some embodiments, the group of data packets can be referred to as a data packet flow or as a flow.

In some embodiments, a vector, such as the policy vector, can be a binary string defined by, for example, a sequence of high values (represented as 1's) and/or low values (represented as 0's). The values in the binary string can be referred to as bit values. In other words, the vector can define a sequence of bit values. In some embodiments, for example, if a packet classification module is implemented in a hardware system that is a base-n system (e.g., a base-4 system), a vector processed by the packet classification module can be a base-n string. In some embodiments, the vector can be defined as a one-dimensional array. In some embodiments, for example, if a packet classification module is implemented in software, a vector processed by the packet classification module can be a string that includes a sequence of symbols (e.g., American Standard Code for Information Interchange (ASCII) characters) and/or digits. For example, the vector can be a byte string or a hexadecimal value.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, features of embodiments described with respect to one process or module related decompression can be applicable to other processes and/or module related to decompression. Similarly, features of embodiments described with respect to compression can be applicable to decompression.

What is claimed is:

1. A method, comprising:
receiving a policy vector associated with a switch fabric and represented by a bit sequence, the policy vector including a plurality of sectors and having a plurality of policy bit values, a policy bit value from the plurality of policy bit values configured to trigger an action associated with a data packet by the switch fabric;
producing a compressed vector for each sector in a subset of sectors from the plurality of sectors using a compression scheme that is based on a number of repeated policy bit values from the plurality of policy bit values in the policy vector;
matching the compressed vector for the each sector in the subset of sectors from the plurality of sectors to a portion of a data packet; and
forwarding at least the portion of a data packet, in addition to the compressed vector, to a decompression module.

2. The method of claim 1, wherein the compression scheme is a composite compression scheme that is further based at least in part on an address value of a pattern of policy bit values in the policy vector, the pattern stored in a memory at a location represented by the address value.

3. The method of claim 1, wherein the producing includes defining a sequence of policy bit values within the policy vector as a pattern.

4. The method of claim 1, further comprising associating a compression scheme identifier with the compressed vector for the each sector in the subset of sectors to produce a modified compressed vector for the each sector in the subset of sectors, the compression scheme identifier representing the compression scheme.

5. The method of claim 1, wherein the compression scheme is a first compression scheme, the subset of sectors of the policy vector is a first subset of sectors of the policy vector, and the compressed vector for the each sector in the subset of sectors is a first compressed vector for the each sector in the subset of sectors, the method further comprising:
determining a second compression scheme different from the first compression scheme based on a second subset of sectors of the policy vector; and
producing a second compressed vector for each sector in the second subset of sectors of the policy vector based on the second compression scheme.

6. A method, comprising:
receiving at least a portion of a data packet, in addition to a compressed vector representing a sector from a plurality of sectors of a policy vector associated with a switch fabric, the compressed vector having been matched to the portion of the data packet, the policy vector having a plurality of policy bit values, a policy bit value from the plurality of policy bit values configured to trigger an action associated with a data packet by the switch fabric;
determining a compression scheme for the sector based on a compression scheme identifier associated with the compressed vector, the compression scheme based on an address value of a pattern of policy bit values in the policy vector, the pattern stored in a memory at a location represented by the address value; and
decompressing the sector based on the compressed vector and the compression scheme.

7. The method of claim 6, wherein the compression scheme is a composite compression scheme that is further based at least in part on a repeated policy bit value in the policy vector.

8. The method of claim 6, further comprising retrieving from a memory, before the decompressing, a pattern associated with the compressed vector, the decompressing including producing a decompressed policy vector having the pattern.

9. The method of claim 6, wherein the sector of the policy vector is a first sector of the policy vector, the compression scheme is a first compression scheme, and the compressed vector is a first compressed vector,
the method further comprising:
receiving a second compressed vector associated with a second sector of the policy vector;
determining a second compression scheme of the second compressed vector based on a compression scheme identifier associated with the second compressed vector, the compression scheme of the second compressed vector being different from the first compression scheme of the first compressed vector; and
decompressing the second sector of the policy vector based on the second compression scheme and the second compressed vector.

10. The method of claim 6, wherein the sector of the policy vector is a first sector of the policy vector, the compression scheme is a first compression scheme, and the compressed vector is a first compressed vector,
the method further comprising:
receiving a second compressed vector associated with a second sector of the policy vector;
determining a second compression scheme of the second compressed vector based on a compression scheme identifier associated with the second compressed vector;
decompressing second sector of the policy vector based on the compression scheme of the second compressed vector and the second compressed vector; and
reconstructing the policy vector based on the first sector of the policy vector and the second sector of the policy vector.

11. An apparatus, comprising:
a first decompression logic configured to apply a first compression scheme to decompress a first compressed vector received in addition to a data packet, the first compressed vector having been matched to a first portion of the data packet, the first compressed vector uniquely associated with a first subset of sectors of a policy vector at a first time, the policy vector being associated with a switch fabric, the policy vector being represented by a bit sequence, the first decompression logic configured to determine a placement of a repeated bit value in the bit sequence within the policy vector;
a first memory block operatively coupled to the first decompression logic, the first memory block being configured to store a bit sequence from the first subset of sectors of the policy vector;
a second decompression logic configured to apply a second compression scheme, different from the first compression scheme, to decompress a second compressed vector received with the data packet, the second compressed vector having been matched to a second portion of the data packet, the second compressed vector uniquely associated with a second subset of sectors of the policy vector at a second time, the second decompression logic configured to determine an address value of the bit sequence in the first memory block, the address value storing a pattern of policy bit values within the policy vector; and
a second memory block being operatively coupled to the second decompression logic, the second memory block being configured to store a bit sequence from the second subset of sectors of the policy vector.

12. The apparatus of claim 11, wherein:
the first decompression logic is configured to apply the first compression scheme to the first compressed vector based on a compression identifier associated with the first compressed vector; and
the second decompression logic is configured to apply the second compression scheme to the second compressed vector based on a compression identifier associated with the second compressed vector.

13. The apparatus of claim 11, wherein:
the first decompression logic is configured to apply one of a compression scheme based on a repeated bit value within the policy vector, a compression scheme based on an address value of the bit sequence in the first memory block, and a composite compression scheme based on a repeated bit value within the policy vector and an address value of the bit sequence in the first memory block; and
the second decompression logic is configured to apply one of a compression scheme based on a repeated bit value within the policy vector, a compression scheme based on an address value of the bit sequence in the first memory block, and a composite compression scheme based on a repeated bit value within the policy vector and an address value of the bit sequence in the second memory block.

14. The apparatus of claim 11, further comprising an output module configured to produce the policy vector based on the first compressed vector and the second compressed vector.

15. The apparatus of claim 11, wherein the first time is different than the second time.

* * * * *